A. G. CRAWFORD.
STEERING DEVICE FOR TRACTORS.
APPLICATION FILED AUG. 5, 1920.
1,380,638.
Patented June 7, 1921.
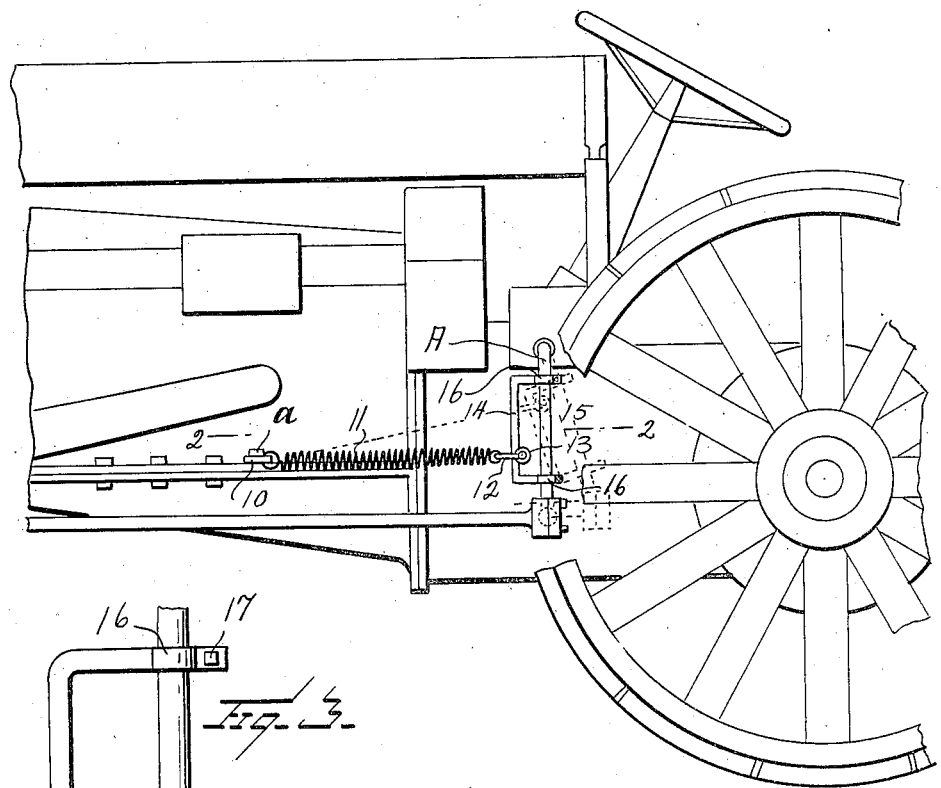
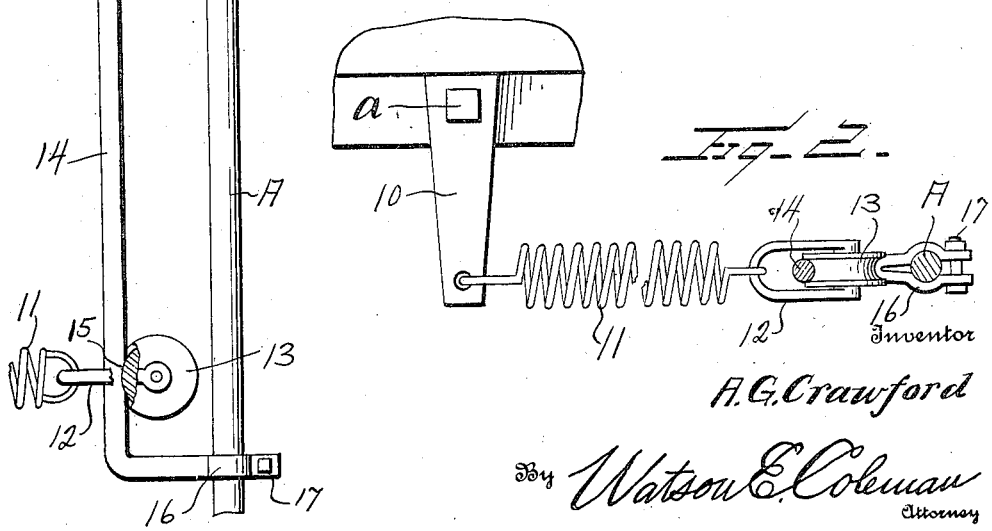
Inventor
A. G. Crawford
By Watson E. Coleman
Attorney

UNITED STATES PATENT OFFICE.

ALBERT G. CRAWFORD, OF IROQUOIS, SOUTH DAKOTA.

STEERING DEVICE FOR TRACTORS.

1,380,638. Specification of Letters Patent. Patented June 7, 1921.

Application filed August 5, 1920. Serial No. 401,399.

*To all whom it may concern:*

Be it known that I, ALBERT G. CRAWFORD, a citizen of the United States, residing at Iroquois, in the county of Kingsbury and State of South Dakota, have invented certain new and useful Improvements in Steering Devices for Tractors, of which the following is a specification, reference being had to the accompanying drawings.

This invention relates to the steering mechanism of tractors, and particularly to an attachment to be used in connection with a specific form of tractor now on the market when the latter is used for plowing.

The tractor, upon which this attachment is to be used, runs with two right side wheels in the furrow when plowing. This makes the right side of the tractor lower than the left side of the tractor and has a tendency to make the tractor crown to the right. This requires that the driver should hold the wheels firmly to the left all the time, that is should hold the steering wheels so that the traction wheels should have a tendency to move toward the left, thus preventing the machine creeping into the plowed ground and making a narrower cut for the plows than it properly should do.

The general object of my invention is to provide a device in the nature of an attachment which will urge the front wheels of the tractor toward the left, resisting this tendency to creep into the plowed ground without, however, preventing the actuation of the steering mechanism by the operator.

A further object is to provide a device of this character in which the tension of the spring, which acts to urge the front wheels of the tractor to the left, is automatically reduced and practically becomes negligible when the operator turns the front wheels toward the right at the end of the field.

A further object is to provide a device of this character which is readily attachable to certain type of tractor and which does not require any change in the tractor construction itself.

Other objects will appear in the course of the following description.

My invention is illustrated in the accompanying drawings, wherein:—

Figure 1 is a fragmentary side elevation of a tractor with my device applied thereto;

Fig. 2 is a top plan view, the bar 14 and the arm A being shown in section;

Fig. 3 is an elevation of the arm A and the rod 14 applied thereto.

Referring to these drawings, it will be seen that I have illustrated so much of a tractor as is necessary for a correct understanding of this device. My attachment comprises a bracket 10 which is adapted to be bolted to the machine and specifically bolted to the crank case by any of the crank case bolts, as for instance the bolt a. This bracket is about 9″ long, and engaged with the extremity of the bracket is a relatively long coiled contractile spring 11, which is approximately 16 or 18″ in length and carries at its extremity a yoke 12 having thereon the flanged wheel 13. Attached to the usual steering wheel arm A of the tractor and extending approximately parallel thereto is a rod 14 which may be approximately 10″ in length and which is preferably circular in cross section and is formed adjacent its lower end and upon its inner face, that is the face confronting the steering arm A, with a single concave recess 15 forming a seat for the roller 13. The extremities of the bar 14 are provided with clamps 16 whereby the bar or rod 14 may be clamped to the steering arm A. These clamps are formed of two jaws urged together by bolts 17, or any suitable construction of clamp may be used.

As before remarked, the bracket 10 is to be bolted to the side of the crank case by removing one of the crank case bolts and putting the bracket in place and again replacing the bolt. The tension of the spring 11 may be varied by arranging the bracket 10 in different positions on the crank case by means of the crank case bolts. It will be seen that the tension of spring 11, pulling forward as it does on the steering arm A, tends to turn the front wheels of the tractor to the left. The front wheel, which travels in the plowed furrow, is held to the land side and this permits the plow to cut a uniform width at all times and acts to resist any tendency of the front wheels to creep into the plowed ground. At the end of the field, when it is desired to turn the front wheels of the tractor to the right, the steering wheel B is actuated as usual and this shifts the steering arm A back to the dotted line position in Fig. 1 and causes the flanged pulley 13 to roll up to the top of the track formed by the rod 14, thus relieving the tension of the spring 11 from the steering wheel when turning the tractor to the right. When the steering arm A is brought back to its normal position where it is disposed nearly in a vertical plane, the roller 13 will again roll down the track 14 and exert its tension upon the steering arm to turn the front wheels of the tractor toward the left.

This attachment does away with the strain on the operator who, when plowing, must hold the steering wheel firmly so as to hold the front wheels of the tractor toward the left all the time while the plow is making a cut. This strain is very tiring on the operator, but the spring of my attachment assists the operator when the tractor is plowing, thus doing away with the strain.

While I have illustrated a particular embodiment of my invention, I do not wish to be limited thereto, as it is obvious that many changes might be made in the details of construction and arrangement of parts without departing from the scope of the invention as defined in the appended claims.

I claim:—

1. The combination with a tractor having ground engaging, dirigible steering wheels, and a manually controlled steering mechanism including an arm, of a track detachably clamped to the arm and moving therewith, a spring attached at one end to the frame of the machine and at its other end having a roller shiftably engageable with said track.

2. The combination with a tractor having ground engaging, dirigible steering wheels, and a manually controlled steering mechanism including an arm, of a track operatively connected to the arm and moving therewith, a spring attached at one end to the frame of the machine and at its other end having a roller shiftably engageable with said track, the track having a seat at its lower end for the roller.

3. An attachment for tractors comprising a bracket adapted to be attached to the crank case of the tractor, a coiled contractile spring attached at one end to the bracket and carrying a roller at its other end, and a track bar angularly bent at its ends and having clamps at its ends whereby it may be attached to the steering arm of the tractor and over which track the roller operates.

4. An attachment of the character described comprising a bracket adapted to be attached to the crank case of a tractor, a coiled contractile spring attached at one end to the bracket and having a roller at its opposite end, a track bar over which said roller operates and having a seat with which the roller is adapted to engage, and steering arm clamps carried by the ends of the track bar and adapted to engage the steering arm of a tractor to urge the arm in one direction.

In testimony whereof I hereunto affix my signature.

ALBERT G. CRAWFORD.